(Model.)

T. JOHNSTON.
PAWL AND RATCHET MECHANISM.

No. 464,938. Patented Dec. 8, 1891.

Witnesses:
Jas. E. Hutchinson.
Henry C. Hazard.

Inventor
Thomas Johnston
by Riddle and Russell
his Attorneys

UNITED STATES PATENT OFFICE.

THOMAS JOHNSTON, OF NEWBURG, NEW YORK.

PAWL-AND-RATCHET MECHANISM.

SPECIFICATION forming part of Letters Patent No. 464,938, dated December 8, 1891.

Application filed February 26, 1891. Serial No. 382,893. (Model.)

*To all whom it may concern:*

Be it known that I, THOMAS JOHNSTON, of Newburg, in the county of Orange, and in the State of New York, have invented certain new and useful Improvements in Pawl-and-Ratchet Mechanisms; and I do hereby declare that the following is a full, clear, and exact description thereof, reference being had to the accompanying drawings, in which—

Figure 1:
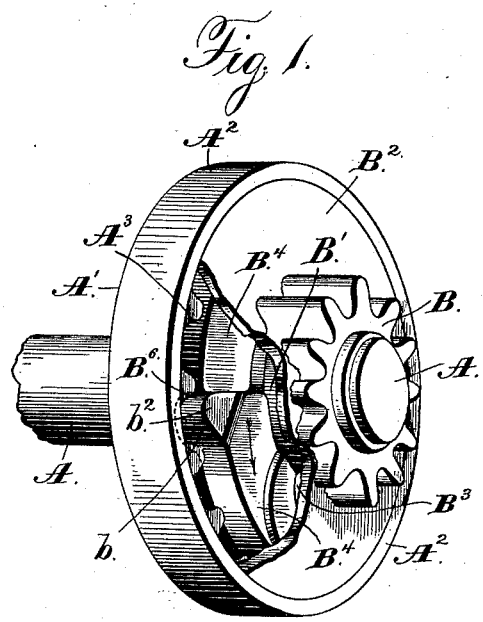
Figure 2:
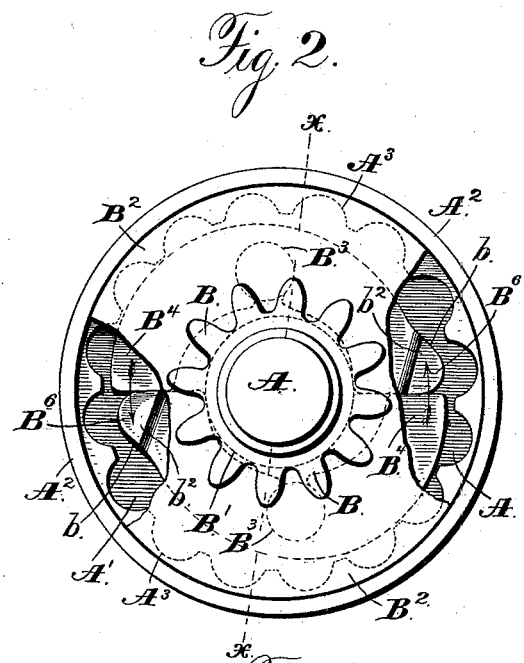
Figure 3:
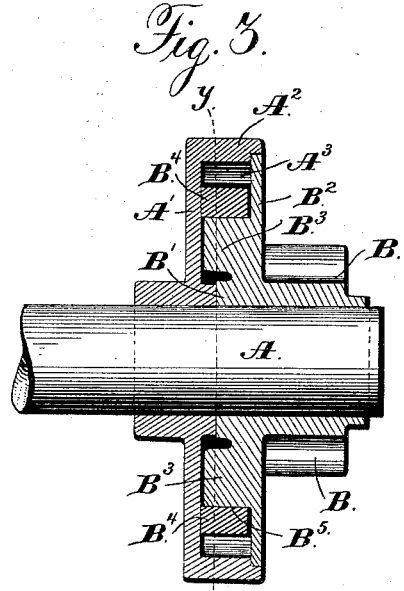
Figure 4:
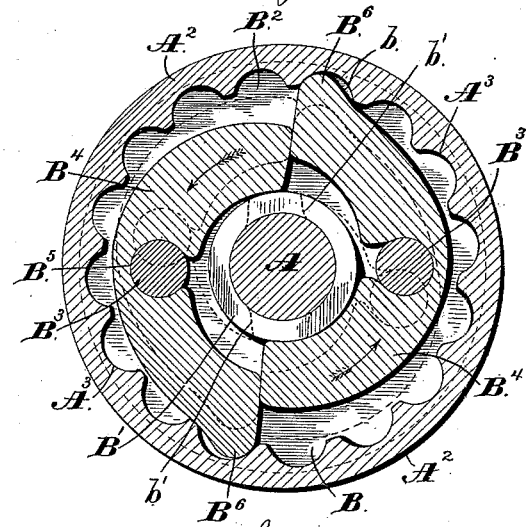

Figure 1 shows a perspective view of my improved pawl-and-ratchet device with a portion of the pinion-flange broken away; Fig. 2, a view of the same in end elevation; Fig. 3, a view of a section on line $xx$ of Fig. 2, and Fig. 4, a view of a section on line $yy$ of Fig. 3.

Letters of like name and kind refer to like parts in each of the figures.

The object of my invention is to provide an improved pawl-and-ratchet device for clutching two separate parts or pieces of mechanism together when one of them moves in one direction and unclutching and leaving them disconnected when said piece moves in the opposite direction.

The special purpose of my invention has been to provide a pawl-and-ratchet clutch device for connecting the driving-pinion with the rotary cutter-shaft of a lawn-mower; but it will be found that my device is equally applicable for connecting pinions and shafts or other devices in other machines than lawn-mowers wherever it is desired that two separate parts, whether pinions and shafts, two shafts, two wheels, or other devices, shall be clutched together or unclutched and independent of each other, according as the one of them which is to drive or move the other moves in one direction or the other. Where spring-pawls and those thrown into operative position or engagement with the teeth of a ratchet by gravity or centrifugal action have been used for this purpose, it has been found that the device is objectionable both on account of the continual noise made by the pawl riding over the ratchet-teeth during the backing motion of the pawl-carrying part and because of the wear of the pawl end against the teeth during such motion. With these objections to the spring, gravity, and centrifugal pawls as heretofore used in view I have invented the present device, which is so constructed that as soon as the part to be clutched to the other moves in one direction the two parts will be instantly coupled together, while the first backing movement of the pawl-carrying part causes a withdrawal of each pawl, so that the same does not engage or ride over the ratchet-teeth. The backing motion of the latter part will then be a noiseless one and unattended with wear of the pawl end and teeth upon each other.

In the drawings, A and B designate, respectively, the two parts or pieces of mechanism which are to be coupled or clutched together as one of them moves in one direction and unclutched as said part moves in the opposite way.

As shown, A represents a shaft—such, for instance, as that of the rotary cutter of a lawn-mower—while B is in the form of a pinion for driving said shaft. Upon the shaft there is fixed or formed a disk A', having on its side toward the pinion B a projecting annular flange $A^2$, which internally is corrugated or provided with the series of rounded notches or depressions $A^3 A^3$. The driving-pinion, which is shown as journaled upon the shaft, but can be, if desired, supported upon a separate journal stud or shaft in line with shaft A, is on its side or end toward disk A' provided with the hub B' and the flange or plate $B^2$, which latter has its outer edge close to or just within the edge of the flange $A^2$. I prefer to make this plate to fit close to the flange, as set forth, in order that the space within which the pawls, to be described, are to work may be inclosed and kept from the access of dirt or clogging material. Instead the plate may be smaller or cut away in various parts without departure from my invention. On the inner side or end of the pinion are also the rounded studs $B^3 B^3$, parallel to and on diametrically-opposite sides of hub B', and pivoted upon them are the pawls $B^4 B^4$, of peculiar shape and construction. Each of these pawls, which are exact duplicates of each other, so that they can, in the manner hereinafter set forth, be arranged to clutch the pinion to the shaft as the latter moves in either direction, is semicircular in shape, has at its middle point a pivotal opening $B^5$ to engage one of the studs $B^3$, and has the portions on opposite sides of its pivot arranged to substantially balance each other, so that when the pawl is carried around by the rotation of the pinion the action of centrifugal force will not tend to swing the pawl one way or the other upon its pivot. At one end each pawl has an outwardly-projecting toe $B^6$ to engage the notches or corrugations $A^3 A^3$ on the inner face of the flange $A^2$ on the disk $A'$. Such toe is preferably rounded, as shown, but can be otherwise shaped, if desired. However formed, it should have its rear side, which is designated by $b$ in the drawings, rounded or inclined from its outer end inward and rearward toward the body of the pawl. The two pawls, which are placed upon the pivot-studs $B^3 B^3$ with their noses pointing in opposite directions, are of such extent that together they substantially surround the hub $B'$, the nose end of one standing close to the heel end of the other. The length of each pawl, or the distance from the outer extremities of its toe and heel, is made a little less than the diameter of the circle in which stand the inner ends of the projections or teeth between the notches $A^3 A^3$ in the disk-flange $A^2$, so that when the pawl is drawn inward far enough to disengage its toe from the flange-notches its heel need not project sufficiently to be in the path of said projections or teeth. The concavity on the inner side of each pawl is of such size and shape with reference to the pinion-hub $B'$ that the inner side of the heel portion will come into contact with the hub when the pawl has been moved bodily outward sufficiently to bring its toe into engagement with one of the flange notches or corrugations, and the inner side of the toe portion will strike said hub on the other side of the pivot when the pawl has been moved inward to withdraw its toe from its notch-engaging portion. With this construction the hub obviously acts as a stop to limit the movement of the pawl in either direction.

Instead of the pinion-hub, some other form of stop for the pawl ends could be used, as desired, without departure from this invention. For instance, the pinion might, in place of the hub entirely surrounding the shaft upon which it is journaled, have but a partial hub or two projecting stop-lugs, as indicated by dotted lines at $b' b'$ in Fig. 4, or the supporting-shaft itself might be used as a stop for the inner sides of the pawl-legs. I prefer, however, to use the hub B, as shown in the drawings, and described hereinbefore.

For a purpose to be understood from a description of the operation of my device to be hereinafter given, the toe end of each pawl is made slightly thicker than the heel end thereof, in order to provide on both sides of the toe a raised surface $b^2$, adapted to engage the inner face of the disk $A'$, so as to produce a certain amount of friction thereon.

The operation of my device is, briefly, as follows: As the pawls are balanced, there will obviously be no tendency on the part of centrifugal action, caused by rotation of the pawl-carrying driving part, to swing said pawls either one way or the other on their pivots. When, then, the pawls are drawn inward and the pinion or other driving part carrying them is turned backward, the pawl-noses will not be swung out into contact with and caused to ride over the ratchet-teeth, as in the case of the centrifugal pawls heretofore used. With the parts in position as shown in Figs. 1 and 2, the pawls being moved inward until their toes are out of position for engaging the notches or corrugations $A^3 A^3$ and the inner sides of their toe-carrying legs are in contact with the hub $B'$ or other stop provided to limit their inward motion, the pinion or other driving device carrying the pawls is free to be rotated in the direction indicated by the arrow in the figures just above referred to without any noise or rattling of the pawls and without any danger of a pawl getting out into position to engage or be struck by the projections between the notches in the disk-flange $A^2$; but as soon as rotation in the opposite direction (indicated by the arrows in Fig. 4) begins both pawls will, by the action of their respective pivot-studs $B^3 B^3$, be carried bodily outward into the position shown in full lines in such figures, so that their toes will be seated in notches in the disk-flange and their heel portions or legs will be in contact with the hub $B'$ or other stop device provided therefor. The friction of the sides of the toe ends of the pawls against the inner face of disk $A'$ assists the above-described action of the studs $B^3 B^3$ in carrying such ends of the pawls outward into operative position. While, if desired, the flange $A^2$ or the bottoms of the recesses or notches therein could be relied upon to limit the outward movement of the pawls, I prefer to secure the limitation of the pawls' travel by the stop or stops, as described, adapted to be engaged by the heel portions or legs of the pawls. With this arrangement I prevent the great outward strain on the flange $A^2$ and the tendency to jam and break the points or toes of the pawls which are found to exist in pawl-and-ratchet devices in which the pawls are pivoted and are not limited in their motion, as are mine. As long as the pinion or other pawl-carrying driving part of my device is turned in the direction last described or force is applied tending to so turn it the toes of the pawls will remain positively seated in the respective notches of the disk-flange $A^2$, and there is no tendency on the part of the pawls to move inward; but when movement of the pawl-carrier in the other direction takes place the studs $B^3 B^3$ at once draw the pawls over inward to disengage their toes from the flange-notches, and the pawl-carrier and disk $A'$ are free to rotate independently of each other. The inclined or rounded faces $b\ b$ on the rear sides of the pawl-toes assist the inward drawing action of the pawl-supporting studs by engaging the rear sides of the engaged notches as the pawl-carrier is turned back. Obviously if, when the pawls are out in their operative positions, the pinion should be stopped, or the shaft or other part on which is the disk A' should run beyond or faster than the pinion, the projections on the flange A² would by engaging the said inclined faces on the pawl-toes cam the latter in at once out of their path, so that the revolution of the part would be free and without continued noise.

My pawl-and-ratchet mechanism, arranged and operating as set forth, is cheap, simple, and not liable to get out of order or be broken. It is instantaneous in its action to clutch or unclutch the shaft and pinion or other two pieces to be coupled together and is entirely free from the continuous noise and wear of the pawls during back movement, which take place in the ordinary backing-ratchet devices in which the pawls are, by gravity, springs, or centrifugal action, kept out in contact with the ratchet-teeth. With the notches or corrugations in the flange A² made rounded, as described, and the pawls exact duplicates in shape, if it should be desired to clutch the pinion or other pawl-carrying driving device to the shaft when the former moves in a direction opposite to that indicated by the arrow in Fig. 4 all that is necessary is to take the pawls off of their pivot-studs and turn them around so that their respective noses point in the opposite directions and replace them on the studs again. My device is then, without change in the shape of the pawls or of the ratchet, capable of use in the clutching of two parts together, as the driving one of said parts moves in either direction.

While I have shown and described two pawls, I desire it to be understood that it is not necessary to have both. One will act very well, though I prefer the two arranged with their toes pointing in opposite directions to engage notches on diametrically-opposite sides of the flanged disk A'.

I do not claim or intend to cover by the claims in this application a pawl-and-ratchet mechanism in which there is a curved pawl pivoted upon the shaft or other part to be driven, and the ratchet-teeth of the driving part are relied upon to engage one end of such pawl, so as to swing the other end outward into tooth-engaging position as the driving part is turned backward.

Having thus described my invention, what I claim is—

1. In a pawl-and-ratchet mechanism, in combination with the rotary driving part and a balanced pawl pivoted on the same at a point outside of its axis, the part to be driven provided with the series of pawl-engaging notches or recesses to be engaged by the pawl as it is thrown outward, substantially as and for the purpose specified.

2. In a pawl-and-ratchet mechanism, in combination with the rotary driving part and the two balanced pawls pivoted to the latter at points on opposite sides of its axis, the part to be driven provided with a series of recesses or notches outside of the pawls, so that the latter will be thrown into engagement with them by an outward movement, substantially as and for the purpose set forth.

3. In a pawl-and-ratchet mechanism, in combination with the rotary driving part and a balanced pawl pivoted thereon at a point outside of its axis, a stop to limit the movement of the pawl, and the part to be driven provided with a series of notches or recesses adapted to be engaged by the pawl when the latter is moved to rest against its stop, substantially as and for the purpose shown.

4. In a pawl-and-ratchet mechanism, in combination with the rotary driving part, one or more balanced pawls, a pivot for each pawl eccentrically situated on such part, a stop to limit the inward movement of the end of the pawl which is opposite to its notch-engaging end, and the part to be driven having the series of notches or recesses situated so as to be engaged by the pawl as it is moved outward, substantially as and for the purpose described.

5. In a pawl-and-ratchet mechanism, in combination with the rotary driving part, a balanced pawl pivoted to such part at a point eccentric to its axis and having a notch-engaging toe and a heel on the other side of its pivotal point, a stop to limit the inward movement of the heel, and the part to be driven having a series of notches or recesses to be engaged by the nose of the pawl when it is moved outward, substantially as and for the purpose shown and described.

6. In a pawl-and-ratchet mechanism, in combination with the part provided with the pawl-engaging notches or recesses, the rotary part having an eccentrically-situated pivot pin or stud and the hub, and the balanced pawl pivoted upon the stud and having a heel to engage the hub when the pawl has been moved out into position to engage one of the notches or recesses on the part of the device to which the rotary part is to be clutched, substantially as and for the purpose shown.

7. In a pawl-and-ratchet mechanism, in combination with the part provided with the pawl-engaging notches or recesses, the rotary part provided with a hub, the pawl-pivots eccentrically situated on such part, and the two balanced pawls placed on the pivots with their notch or recess engaging ends turned in opposite directions and having heels adapted to engage the hub on the pawl-carrying part when the pawls have been moved out into position to engage the notches on the other part, substantially as and for the purpose set forth.

8. In a pawl-and-ratchet mechanism, in combination with the part provided with the pawl-engaging notches or recesses, the rotary part having the hub, the pawl-pivots on such part on opposite sides of the hub, and the balanced pawl placed on the pivots with their notch or recess engaging ends pointing in opposite directions and having their heel and toe arms on opposite sides of their pivots adapted to come in contact with the hub of the rotary part as the pawls are moved out into operative position and inward from such position, substantially as and for the purpose described.

9. In a pawl-and-ratchet mechanism, in combination with a plate or disk having a flange provided on its inner side with a series of notches or recesses, the rotary pawl-carrying part provided with a hub and one or more balanced pawls pivoted eccentrically upon such part and each having arms on opposite sides of its pivot to come into contact with the hub as the pawl is moved into or out of operative position, substantially as and for the purpose specified.

10. In a pawl-and-ratchet mechanism, in combination with a disk or plate having an annular flange with a series of notches or recesses on its inner side, the rotary pawl-carrying part provided with a hub and with pivot-studs on opposite sides of the latter, and the curved balanced pawls pivoted on such studs with their notch-engaging ends pointing in opposite directions, each pawl having a space between its two ends greater than the diameter of the portion of the hub between them, substantially as and for the purpose shown.

11. In a pawl-and-ratchet mechanism, in combination with the plate or disk having a flange provided with the pawl-engaging notches or recesses, the rotary pawl-carrying part, and one or more balanced pawls, each pivoted to such part at a point eccentric to its axis and having at or near its notch-engaging end a frictional surface to bear against the plate or disk, substantially as and for the purpose set forth.

12. In a pawl-and-ratchet mechanism, in combination with the disk or plate having a flange provided with the pawl-engaging notches or recesses, the rotary part, and a balanced pawl eccentrically pivoted thereon, having its notch-engaging end provided with a raised surface on its side to engage frictionally the notch-carrying plate and its engaging nose provided with an inclined surface on its rear side, substantially as and for the purpose described.

In testimony that I claim the foregoing I have hereunto set my hand this 4th day of December, 1890.

THOMAS JOHNSTON.

Witnesses:
  CHAS. H. HALSTEAD,
  JOHN E. WHITEHILL.